United States Patent
Lau et al.

(10) Patent No.: US 8,796,896 B2
(45) Date of Patent: Aug. 5, 2014

(54) ELECTRIC MOTOR

(75) Inventors: James Ching Sik Lau, Hong Kong (CN); Mao Xiong Jiang, Shenzhen (CN); Gang Li, Shenzhen (CN); Ke Lin Zhou, Shenzhen (CN); Hong Min Wei, Shenzhen (CN); Jie Chai, Shenzhen (CN); Tao Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 306 days.

(21) Appl. No.: 13/278,698

(22) Filed: Oct. 21, 2011

(65) Prior Publication Data

US 2012/0098382 A1    Apr. 26, 2012

(30) Foreign Application Priority Data

Oct. 21, 2010  (CN) .................. 2010 2 0573398 U

(51) Int. Cl.
*H02K 21/12*  (2006.01)
(52) U.S. Cl.
USPC ............ 310/156.47; 310/156.43; 310/156.12; 310/89
(58) Field of Classification Search
USPC ................. 310/156.12, 89, 156.47, 156.43
See application file for complete search history.

(56) References Cited

U.S. PATENT DOCUMENTS

| | | | |
|---|---|---|---|
| 2,544,266 A * | 3/1951 | Kennedy ...................... 29/592.1 |
| 4,548,334 A * | 10/1985 | Huber et al. .................. 220/293 |
| 4,933,582 A * | 6/1990 | Hata et al. ................. 310/154.14 |
| 5,004,943 A * | 4/1991 | Gagneux ....................... 310/239 |
| 5,426,337 A * | 6/1995 | Kobayashi et al. ............. 310/89 |
| 5,942,827 A * | 8/1999 | Neumann et al. ........ 310/154.04 |
| 7,034,424 B2 * | 4/2006 | Kometani et al. ........ 310/156.47 |
| 7,071,592 B1 * | 7/2006 | Lu ............................. 310/156.25 |
| 7,638,920 B2 * | 12/2009 | Niguchi et al. ........ 310/216.004 |
| 2001/0030480 A1 * | 10/2001 | Matsunobu et al. ..... 310/156.53 |
| 2002/0003382 A1 * | 1/2002 | Nakano et al. ........... 310/156.47 |
| 2002/0047431 A1 * | 4/2002 | Fukushima ............... 310/156.47 |
| 2002/0067092 A1 * | 6/2002 | Crapo et al. ............. 310/156.47 |
| 2004/0146230 A1 * | 7/2004 | Lau ............................... 384/420 |
| 2004/0178693 A1 * | 9/2004 | Burgbacher ................. 310/217 |
| 2008/0024028 A1 * | 1/2008 | Islam et al. .................... 310/187 |
| 2009/0060711 A1 * | 3/2009 | Gammack et al. ............. 415/90 |
| 2010/0127587 A1 * | 5/2010 | Qin et al. ........................ 310/89 |

FOREIGN PATENT DOCUMENTS

JP    04165932 A * 6/1992 ............... H02K 1/27

* cited by examiner

*Primary Examiner* — Tran Nguyen
*Assistant Examiner* — Alex W Mok
(74) *Attorney, Agent, or Firm* — Muncy, Geissler, Olds & Lowe, P.C.

(57) ABSTRACT

An electric motor, especially a brushless PMDC motor, has a stator and a rotor rotatably installed inside of the stator. The stator has a housing with an open end, an end cap fixed to the open end of the housing, a stator core fixed to an inner surface of the housing, and windings wound on the stator core. The rotor includes a plurality of permanent magnetic poles. The housing has a flange bent inwardly from the open end of the housing and abutting against the end cap inwardly and axially to thereby fix the end cap to the housing. The length of the flange measured along the circumferential direction of the housing is greater than half of that of the housing.

9 Claims, 4 Drawing Sheets

ELECTRIC MOTOR

CROSS REFERENCE TO RELATED APPLICATIONS

This non-provisional patent application claims priority under 35 U.S.C. §119(a) from Utility Model Application No. 201020573398.5 filed in The People's Republic of China on Oct. 21, 2010.

FIELD OF THE INVENTION

This invention relates to an electric motor and in particular, to an electric motor having a can like housing.

BACKGROUND OF THE INVENTION

Traditional electric motors of the miniature motors and micro-motors type used in industry, in particular, the so-called PMDC (permanent magnet direct current) motors, BLDC (brushless direct current) motors and BLAC (brushless alternating current) motors, have a stator and a rotor rotatably mounted to the stator. The stator comprises a deep drawn housing with an open end. A wound stator core or stator magnets may be fixed to the inner surface of the housing. The rotor comprises a shaft rotatably supported by the stator, rotor core fixed to the shaft and magnets mounted to the rotor core or rotor windings wound about the rotor core. An end cap is fixed to the open end of the housing after the rotor has been installed in the housing.

These traditional electric motors have low rigidity due to the connection between the housing and end cap allowing some minor movement there between. This results in great vibration and noise. This is a particular problem for the brushless motors.

Therefore, there is a desire to develop an improved electric motor and in particular an improved brushless motor, with improved rigidity to thereby reduce vibration and noise produced by the motor.

SUMMARY OF THE INVENTION

Accordingly, in one aspect thereof, the present invention provides an electric motor, comprising: a stator comprising a housing with an open end and an end cap fixed to the open end of the housing; and a rotor rotatably installed inside the stator, wherein the housing comprises a flange bent inwardly from the open end of the housing and abutting against the end cap, inwardly and axially, to thereby fix the end cap to the housing, the length of the flange along the circumferential direction of the housing being greater than half of that of the housing.

Preferably, the length of the flange along the circumferential direction of the housing is greater than 80 percent of that of the housing.

Preferably, the open end of the housing defines a plurality of locking cutouts, and the end cap comprises a plurality of lugs protruding outwardly from the periphery thereof and being locked in respective locking cutouts to thereby prevent the end cap from rotating relative to the housing.

Preferably, the motor is a brushless motor, the stator is a wound stator comprising a stator core fixed to an inner surface of the housing and windings wound on the stator core, and the rotor is a permanent magnet rotor comprising a plurality of permanent magnetic poles.

Preferably, the stator core comprises a yoke and a plurality of teeth extending inwardly from the yoke, the yoke and the teeth meet the following equation:

$$1 < W_y/W_t < 1.3,$$

wherein $W_y$ represents the width of the yoke and $W_t$ represents the width of the teeth.

Preferably, the stator core comprises a yoke and a plurality of teeth extending inwardly from the yoke, the yoke and the teeth meet the following equation:

$$0.35 < W_t/W_s < 0.5$$

wherein $W_s$ represents the height of the teeth measured along the radial direction of the stator and $W_t$ represents the width of the teeth.

Preferably, the number of magnetic poles is 4 and the number of teeth is 6.

Preferably, the rotor comprises a ring magnet forming the permanent magnetic poles, and a skew angle $\Theta$ of boundary lines between adjacent magnetic poles measured at an end plane extending through one end of the magnet is in the range of $(\Theta r, 2\Theta r)$, wherein $\Theta r$, in electrical degrees, is defined as, $$\Theta r = 180 \times (\text{number of magnetic poles in the rotor})/(\text{smallest integer of which both the number of magnetic poles in the rotor and number of magnetic poles in the stator are factors}).$$

Preferably, the rotor further comprises a shaft and a rotor core fixed on the shaft, the magnet being fixed on the circumferential outer surface of the rotor core.

Preferably, the rotor core defines a plurality of grooves at the circumferential outer surface thereof, each groove extending axially from one end of the rotor core to the other end of the rotor core.

Preferably, the boundary lines between adjacent magnetic poles do not radially overlap the grooves.

Preferably, the number of the grooves is equal to the number of magnetic poles, and a start charging point of each magnetic pole is offset from a corresponding end of a corresponding groove.

Preferably, at an end plane extending through an end of the rotor core and a corresponding end of the magnet, an angle $\beta$ formed between a line extending through the center of the rotor and the start charging point of each magnetic pole and another line extending through the middle of the corresponding groove and the center of the rotor is in the range of 10~20 mechanical degrees.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
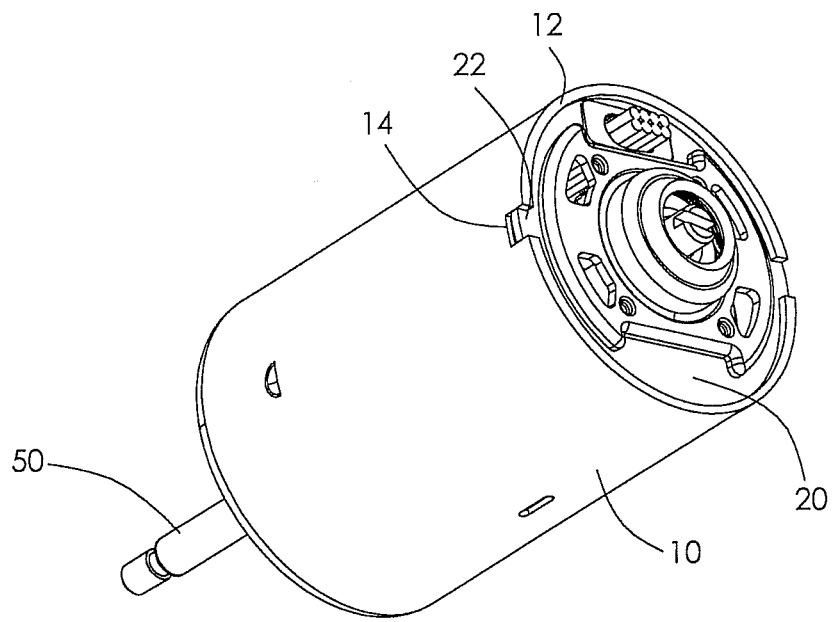
FIG. 1 illustrates a brushless motor according to a preferred embodiment of the present invention.
Figure 2:
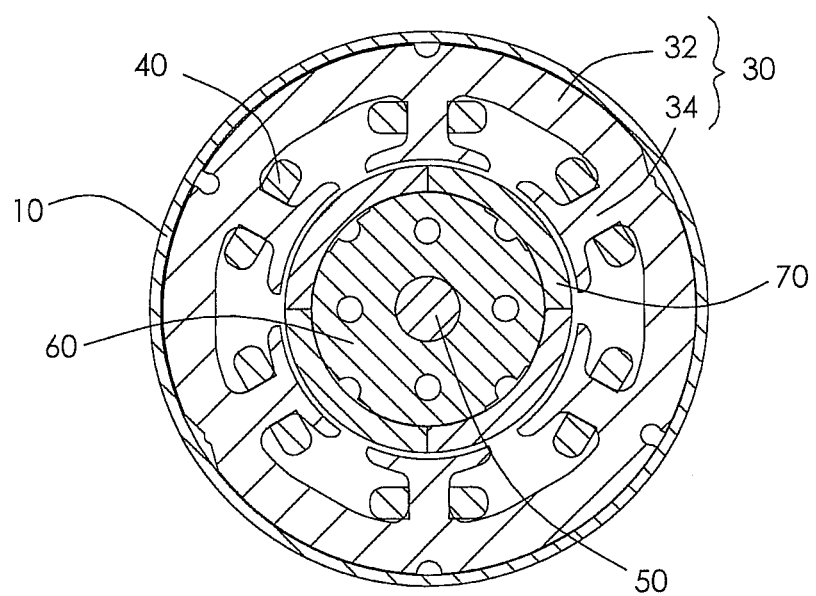
FIG. 2 shows a cross sectional view of the motor of FIG. 1.

FIG. 1 illustrates a brushless motor according to a preferred embodiment of the present invention. FIG. 2 is a cross sectional view of the motor of FIG. 1. The motor comprises a stator and a rotor rotatably installed inside the stator.

The stator comprises a housing 10, a stator core 30 installed at the inner surface of the housing 10, and a plurality of coils 40 wound on the stator core 30. The housing 10 is a deep drawn steel housing with a closed end and an open end. An end cap 20 is fixed to and covers the open end of the housing 10. The housing 10 has a flange 12 bent radially and inwardly from the open end of the housing 10. The flange 12 inwardly abuts against the outer surface of the end cap 20 along the axial direction of the motor, to thereby fix the end cap 20 to the housing 10. Preferably, the length of the flange 12 along the circumferential direction of the housing 10 is greater than half of that of the housing 10. In the embodiment of the present invention, the length of the flange 12 along the circumferential direction of the housing 10 is greater than 80 percent of that of the housing 10. Thus, the end cap 20 is firmly engaged with and fixed to the housing 10, to thereby improve the rigidity of the motor and reduce the motor noise. In the embodiment described, the motor noise when the motor is operating at the maximum speed is reduced to 35 dB which is 8 dB less than a traditional motor operating under the same working conditions.

Preferably, the end cap 20 comprises a plurality of lugs 22 protruding outwardly and radially from the periphery thereof. The open end of the housing 10 defines a plurality of locking cutouts 14. Each lug 22 is locked in a corresponding locking cutout 14 to prevent the end cap 20 from rotating relative to the housing 10. The lugs also provide a support for fixing the relative axial position of the end cap to the housing and the locking cutouts form a seat against which the flange presses the end cap. Alternatively, a step may be formed in the inner surface of the housing adjacent the open end which forms a seat on which the end cap sits to set the axial position of the end cap with respect to the housing and against which the flange presses the end cap.

The stator core 30 comprises a cylindrical yoke 32 and a plurality of spaced teeth 34 extending radially inwardly from the yoke 32. Slots are formed between adjacent teeth 34 for receiving the coils 40. A cylindrical space is formed between the inner ends of the teeth 34.

The rotor comprises a shaft 50 rotatably supported by the stator 30, a rotor core 60 fixed on the shaft 50, a ring magnet 70 fixed on the radially outer circumferential surface of the rotor core 60. The rotor core 60 and magnet 70 are received in the space of the stator 30 and the magnet 70 faces the inner ends of the teeth 34 with an air-gap formed there between to allow the rotor to rotate relative to the stator.

Figure 3:
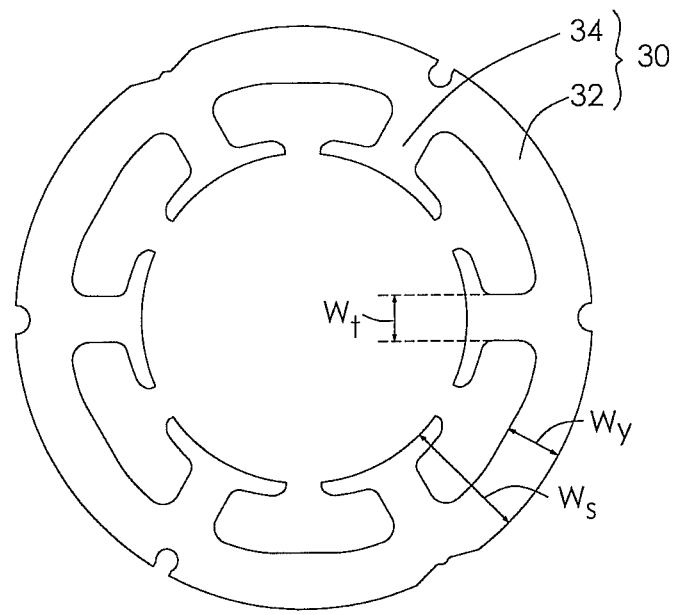
FIG. 3 is a plan view of a stator core of the motor of FIG. 1.

Referring to FIG. 3, the yoke 32 of the stator core 30 has a width represented by Wy and each tooth 34 has a width represented by Wt. Wy and Wt meet the following equation: 1<Wy/Wt<1.3. Each tooth 34 has height measured along the radial direction of the stator and represented by Ws. Wt and Ws meet the following equation: 0.35<Wt/Ws<0.5.

Figure 4:
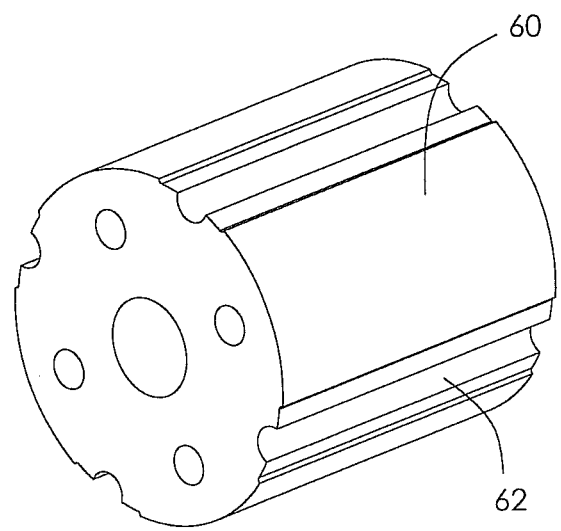
FIG. 4 illustrates a rotor core of the motor of FIG. 1.

As shown in FIG. 4, the rotor core 60 defines a plurality of locating grooves 62 which may be used to locate the rotor core 60 in the process of producing the rotor core 60. The grooves 62 extend axially from one end of the rotor core 60 to the other end and are parallel to the rotation axis of the rotor. In this embodiment, the number of the grooves 62 is equal to the number of the magnetic poles of the magnet 70.

Figure 5:
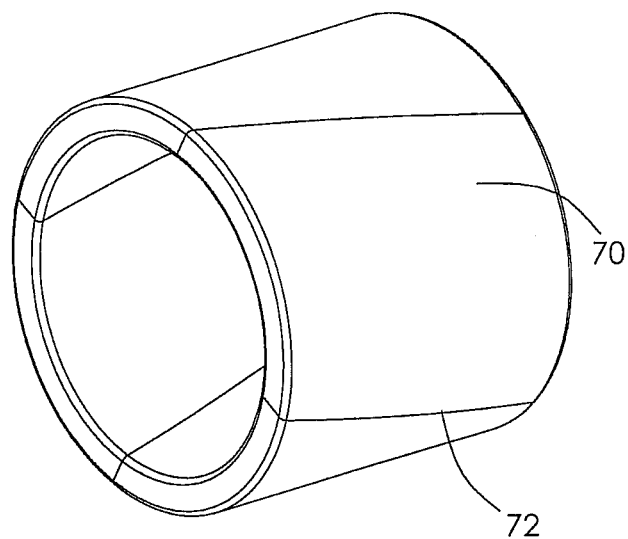
FIG. 5 is an isometric view of a ring magnet of the motor of FIG. 1.

FIG. 5 shows the magnet 70 which comprises a plurality of magnetic poles radially magnetized so that N poles and S poles are arranged alternately along the circumferential direction.

Figure 6:
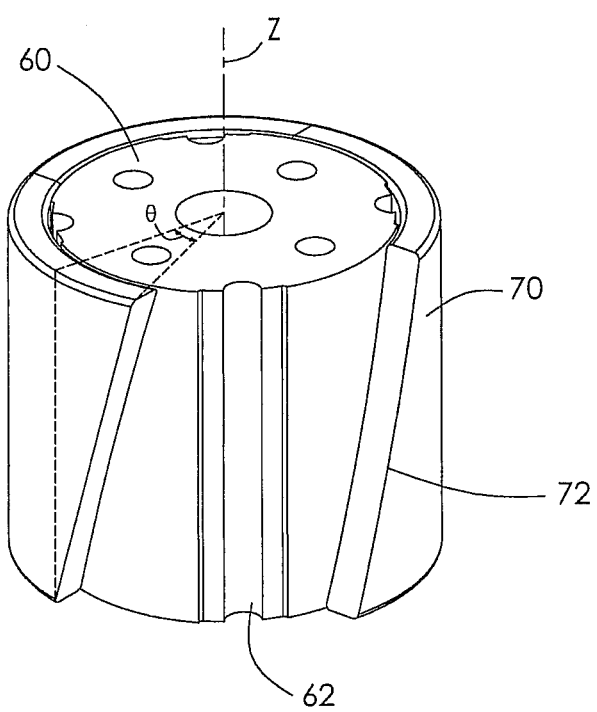
FIG. 6 illustrates the rotor core and the ring magnet assembled together, with a portion of the ring magnet corresponding to one magnetic pole cutaway or removed to show the underlying rotor core.
Figure 7:
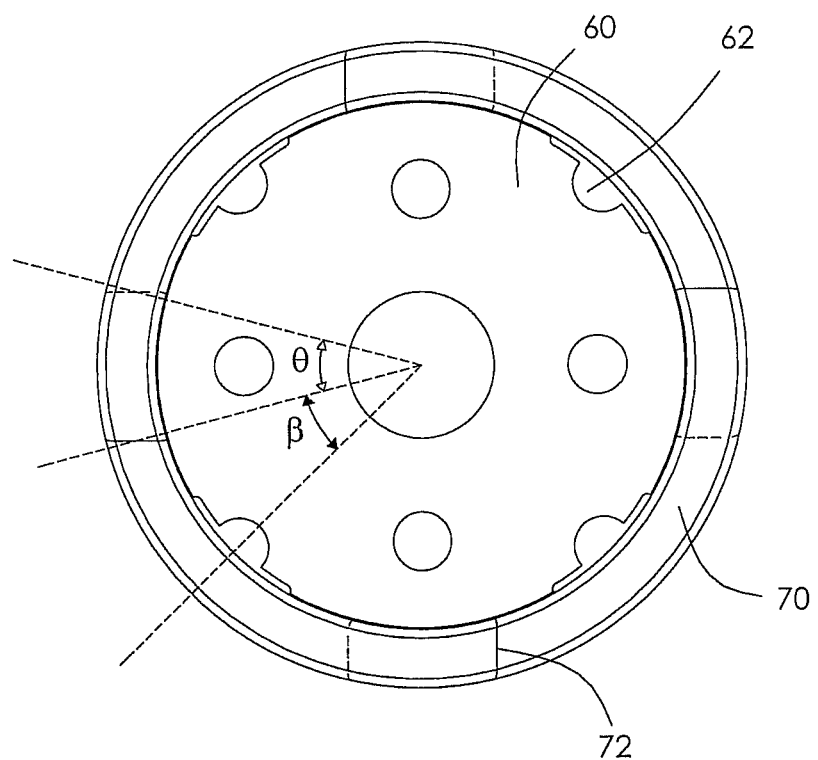
FIG. 7 is plan view of the rotor core and ring magnet assembly of FIG. 6.

FIG. 6 illustrates the rotor core 60 and the ring magnet 70, with a portion of the ring magnet corresponding to one magnetic pole cutaway or removed to show the underlying rotor core. FIG. 7 is an enlarged plan view of FIG. 6. FIG. 6 and FIG. 7 show an angle $\ominus$, known as the skew angle. The skew angle is the angle formed at an end plane of the magnet 70, of an arc spanning from one end of the boundary line 72 to the projecting point of the other end of the boundary line 72 at the end plane along the axis direction of the rotor) of a boundary line 72 between magnetic poles is in the range of ($\ominus r$, $2\ominus r$), wherein the angle $\ominus$ is an electrical angle and $\ominus r$, in degrees, is defined as:

$\ominus r$=180×(number of magnetic poles in the rotor)/
(smallest integer of which both the number of
magnetic poles in the rotor and number of magnetic poles in the stator are factors).

Two end planes respectively extend through opposite ends of the magnet 70 and opposite ends of the rotor core 60. At one end plane, a start charging point (an end of a boundary line between two adjacent magnetic poles) of each magnetic pole is offset from the end of a corresponding locating groove 62 so that the whole boundary line 72 between magnetic poles is away from the groove 62 and no part of the boundary line 72 overlaps the groove 62 in the radial direction of the rotor. This is more clearly shown in FIG. 6 where a section of the ring magnet 70, corresponding to one of the magnetic poles has been cutaway or removed to show that each groove 62 is located completely under the corresponding magnetic pole and does not cross the boundary line 72 between adjacent magnetic poles of the ring magnet 70.

Preferably, the angle β formed at the end plane between a line extending through a starting charging point of a magnetic pole and the center of the rotor and another line extending through the middle of the corresponding groove and the center of the rotor is in the range of 10~20 degrees, the angle β being a mechanical angle.

In the present invention, the magnetic poles are skew poles which can reduce harmonic content of cogging torque to thereby reduce the cogging torque of the motor. The whole boundary line 72 between magnetic poles is away from the locating groove 62 of the rotor core 60 to avoid the magnetically weakest part of the magnet 70 facing a large air gap formed by the groove 62, which can reduce cogging torque too.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

For example, the ring magnet 70 is shown and described as a single piece permanent magnet formed as a ring and charged to produce a number of circumferential arranged magnetic poles which are skewed to the rotor axis. However, the ring magnet could be formed from a number of permanent magnet pieces mounted to the rotor core to form the ring magnet and then charged to produce the skewed magnetic poles.

The invention claimed is:

1. An electric motor comprising:
   a stator comprising:
      a housing having an inner circumferential surface;
      a stator core fixed to the inner circumferential surface of the housing; and
      windings wound on the stator core; and
   a rotor rotatably installed inside the stator and comprising:
      a shaft defining an axial direction;
      a rotor core fixed to the shaft and having a plurality of grooves on a circumferential outer surface thereof, spaced from each other, and extending along the axial direction; and
      a ring magnet fixed on the circumferential outer surface of the rotor core and forming a plurality of permanent magnetic poles in a circumferential direction thereof,
   wherein:
      the number of the grooves on the circumferential surface of the rotor core is equal to the number of the permanent magnetic poles on the ring magnet;
      each of the plurality of permanent magnetic poles has a start charging point offset from a corresponding groove in the circumferential direction; and
      a boundary line between two adjacent permanent magnetic poles is inclined relative to the axial direction and circumferentially confined between two corresponding adjacent grooves.

2. The motor of claim 1, wherein the stator core comprises a yoke and a plurality of teeth extending inwardly from the yoke, the yoke and the teeth meet the following equation:

$$0.35 < Wt/Ws < 0.5$$

wherein Ws represents the height of the teeth measured along the radial direction of the stator and Wt represents the width of the teeth.

3. The motor of claim 1, wherein the stator core comprises a yoke and a plurality of teeth extending inwardly from the yoke, the yoke and the teeth meet the following equation:

$$1 < Wy/Wt < 1.3,$$

wherein Wy represents the width of the yoke and Wt represents the width of the teeth.

4. The motor of claim 1, wherein the stator core comprises a plurality of teeth on which the windings are wound, and a skew angle $\Theta$ of the boundary line between two adjacent magnetic poles defined as a circumferential offset of two end points of the boundary line is in a range of ($\Theta r, 20\Theta r$), wherein $\Theta r$, in electrical degrees, is defined as, $$\Theta r = 180 \times (\text{number of magnetic poles in the rotor}) / (\text{smallest integer of which both the number of magnetic poles in the rotor and the number of teeth in the stator}).$$

5. The motor of claim 1, wherein the plurality of boundary lines between adjacent magnetic poles in the ring magnet do not radially overlap the plurality of grooves in the rotor core.

6. The motor of claim 1, wherein at an end plane extending through an end of the rotor core and a corresponding end of the magnet, an angle β formed between a line extending through the center of the rotor and the start charging point of each magnetic pole and another line extending through the center of the rotor and the middle of the corresponding groove is in a range of 10~20 mechanical degrees.

7. The motor of claim 1, wherein the stator comprises an end cap fixed to the housing, and the housing comprises an open end and a flange bent inwardly from the open end of the housing and abutting against the end cap, inwardly and axially, thereby fixing the end cap to the housing, the flange having a length along the circumferential direction of the housing being greater than half of that of the housing.

8. The motor of claim 7, wherein the length of the flange along the circumferential direction of the housing is greater than 80 percent of that of the housing.

9. The motor of claim 7, wherein:
   the open end of the housing defines a plurality of locking cutouts; and
   the end cap comprises a plurality of lugs protruding outwardly from a periphery thereof and being locked in respective locking cutouts, thereby preventing the end cap from rotating relative to the housing.

* * * * *